Figure 1:
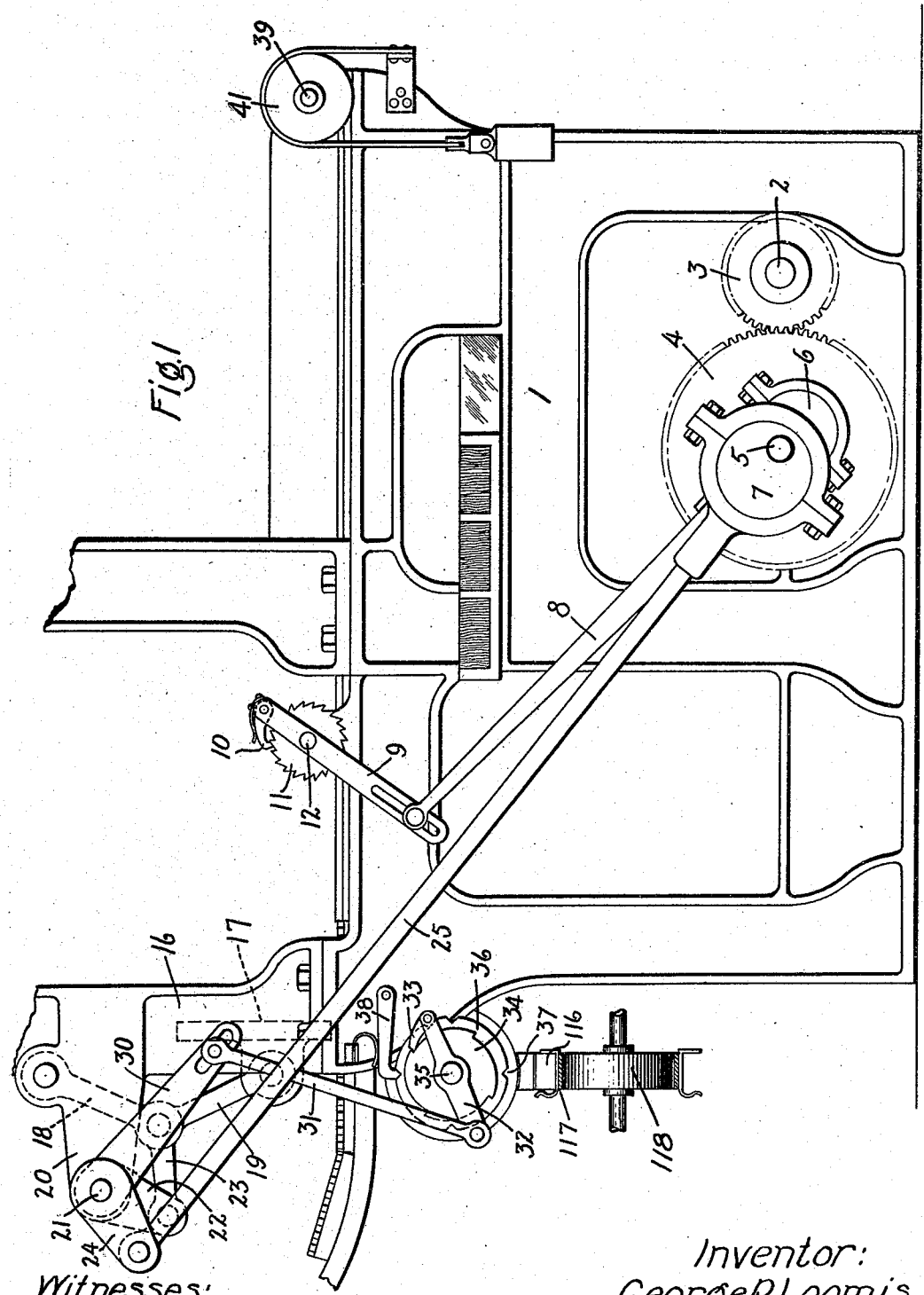

G. P. LOOMIS.
MATCH MAKING MACHINE.
APPLICATION FILED MAY 6, 1907.

900,029.

Patented Sept. 29, 1908.
9 SHEETS—SHEET 1.

Witnesses:
Lloyd C. Bush
Genevieve Haynes

Inventor:
George P. Loomis,
By Alex F. Macdonald
Atty.

G. P. LOOMIS.
MATCH MAKING MACHINE.
APPLICATION FILED MAY 6, 1907.
900,029.
Patented Sept. 29, 1908.
9 SHEETS—SHEET 2.
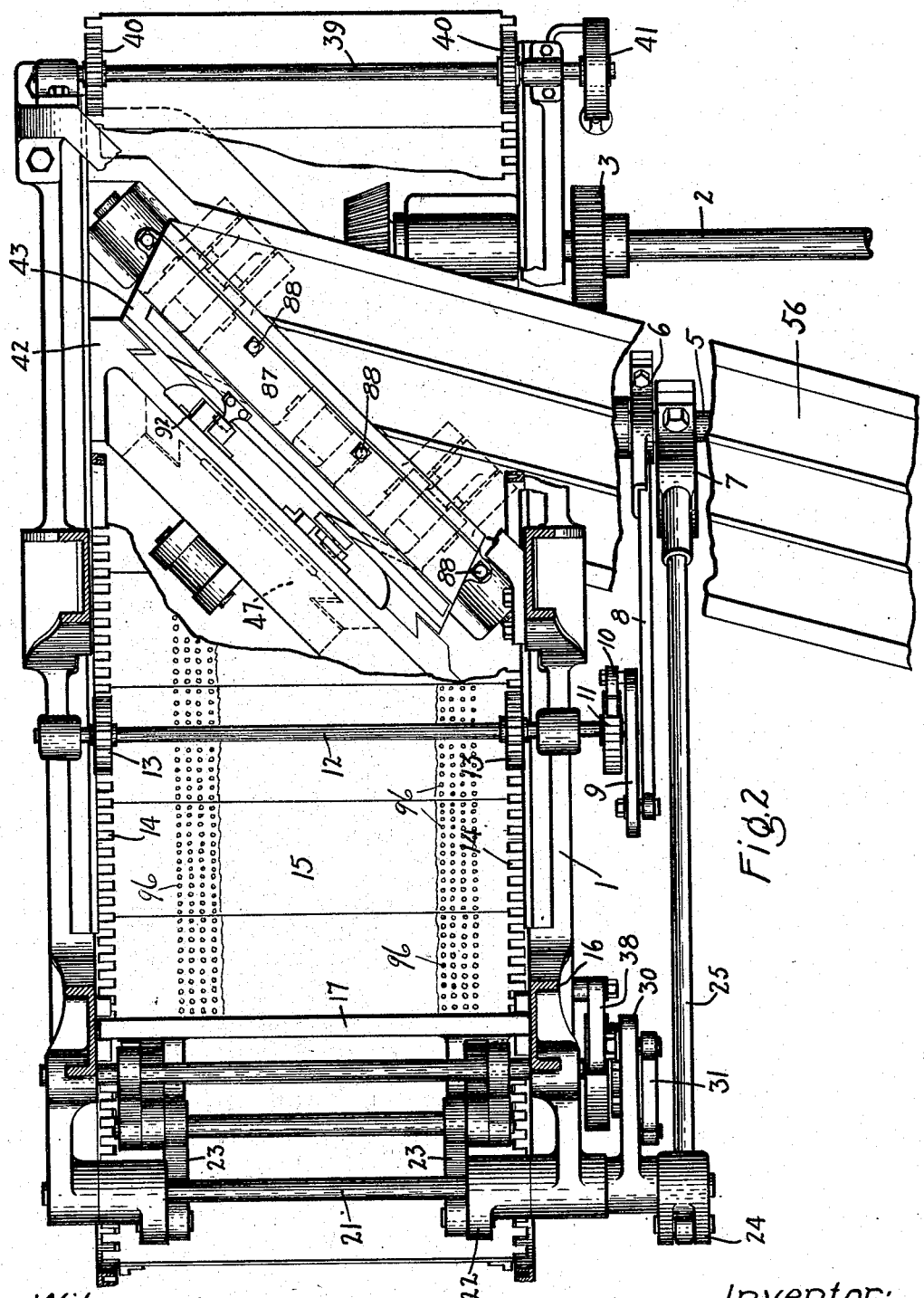
Witnesses:
Lloyd C. Bush
Genevieve Kayper
Inventor:
George P. Loomis
By Alex F. Macdonald,
Atty.

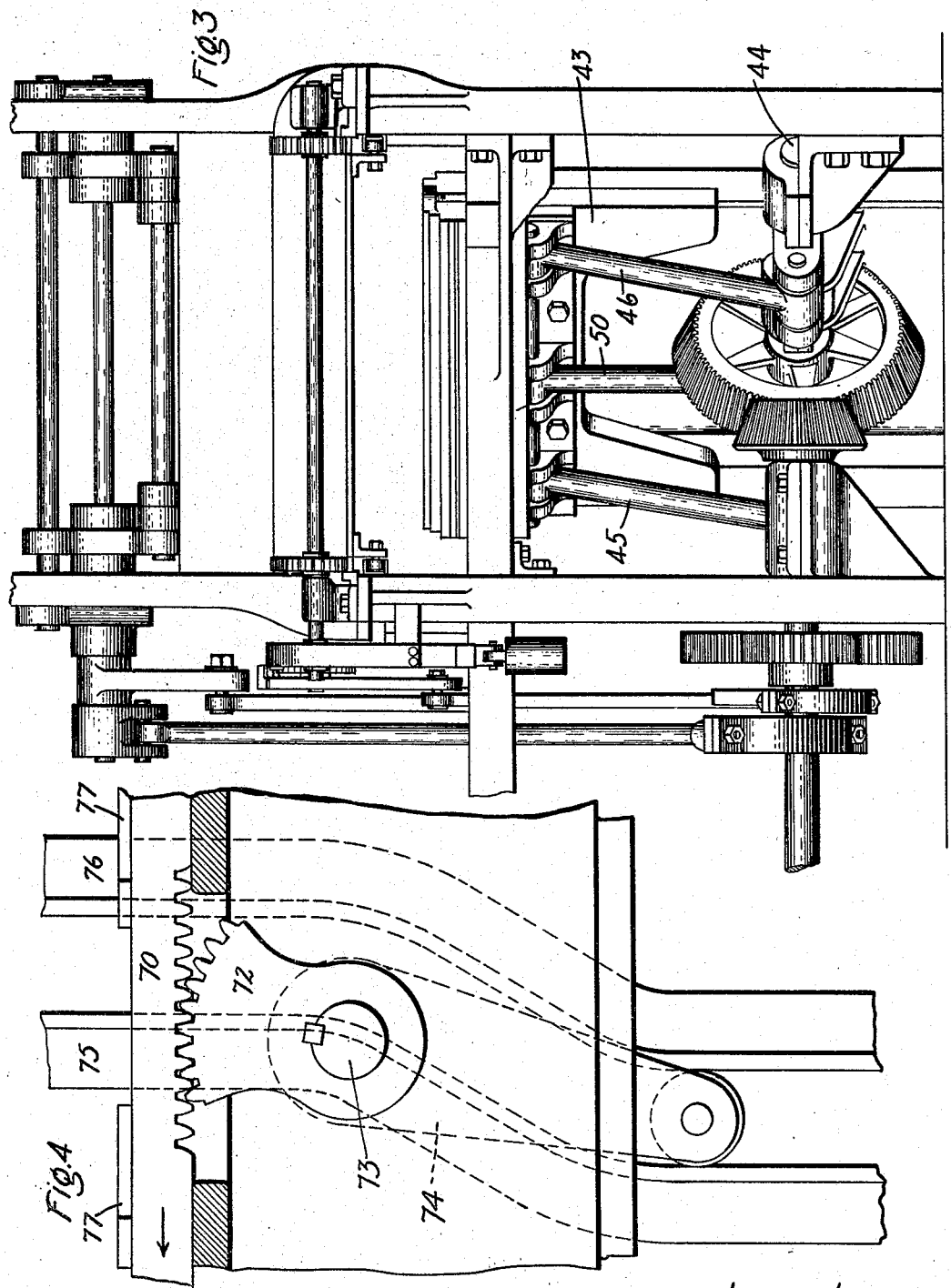

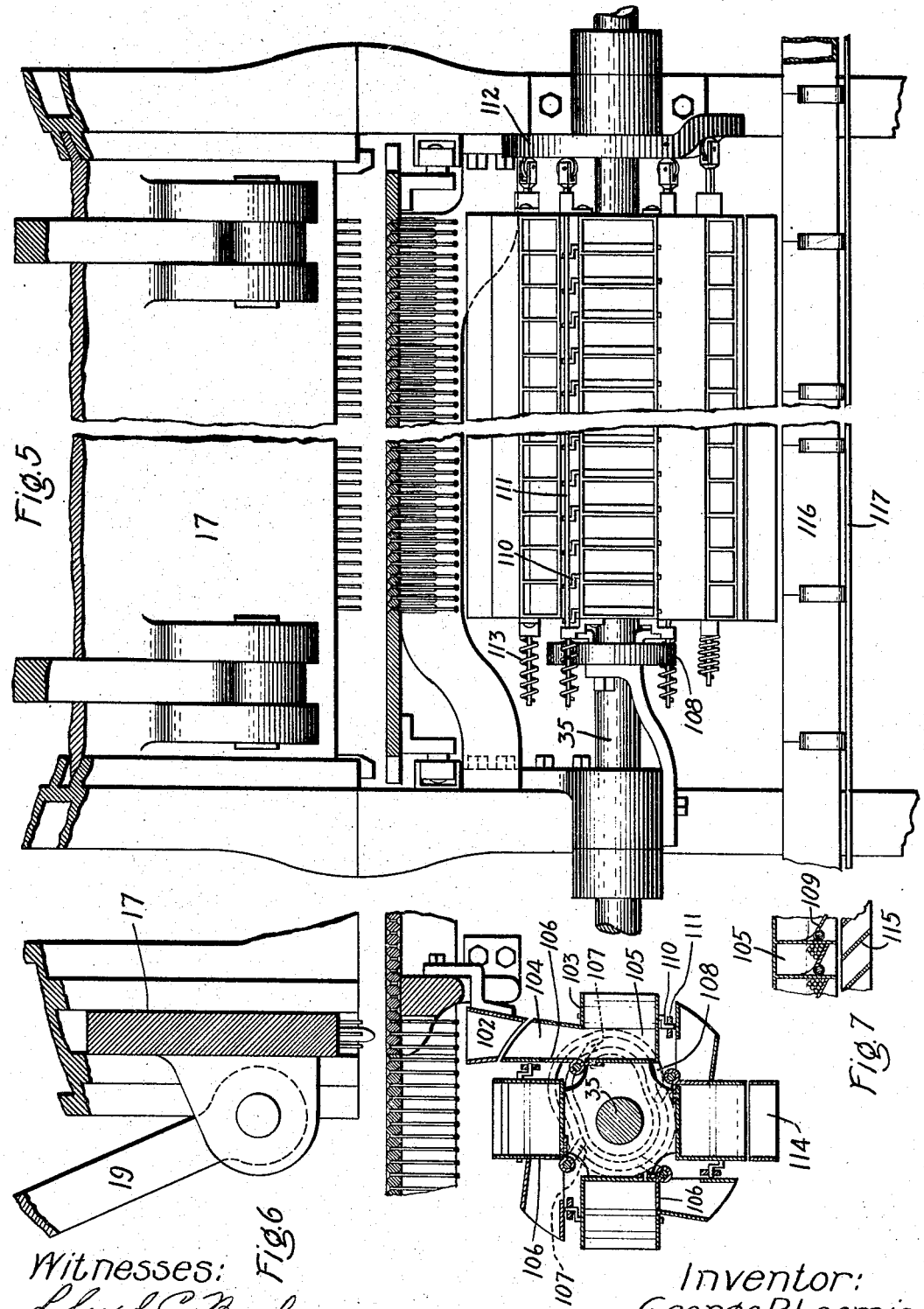

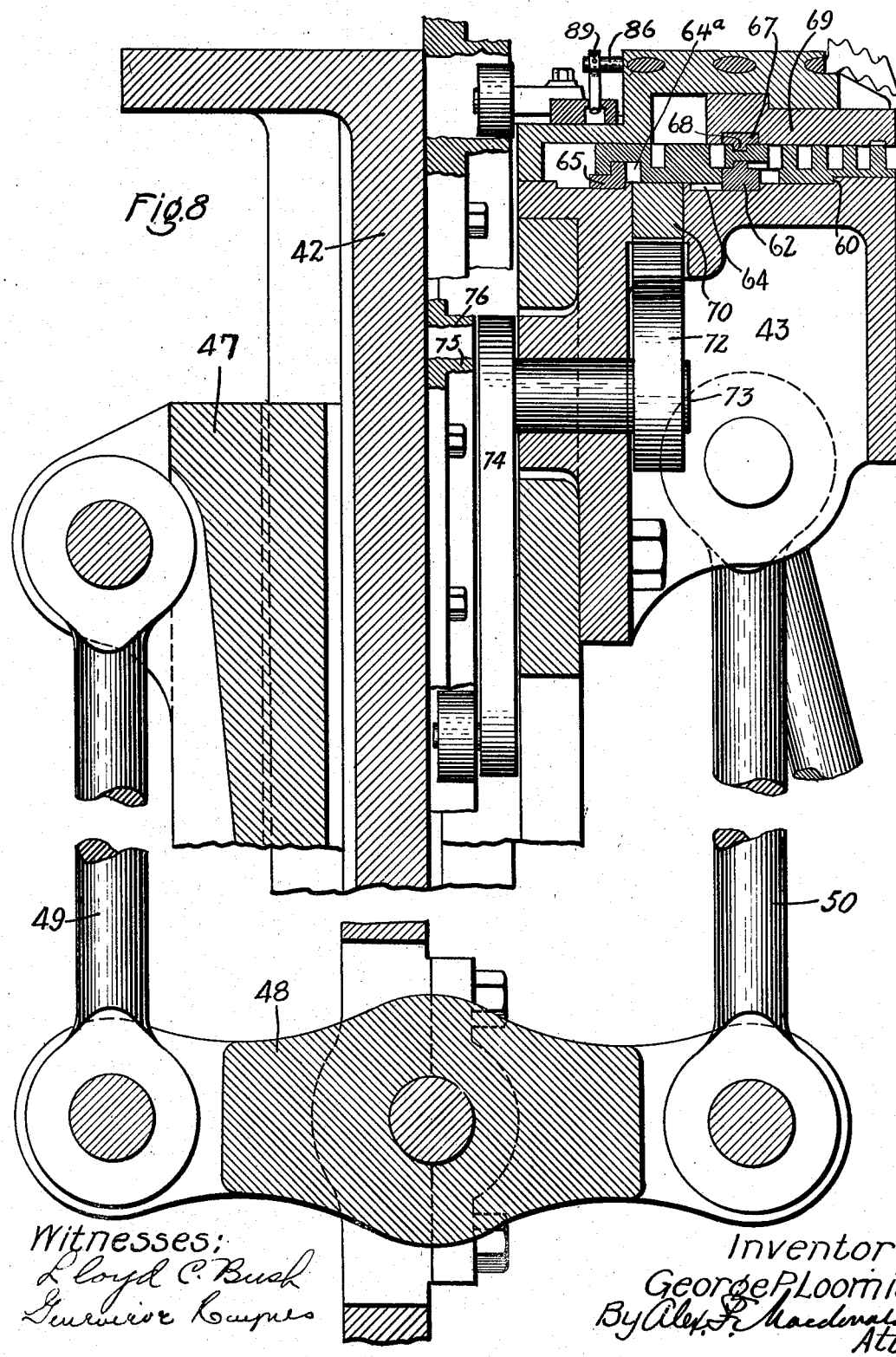

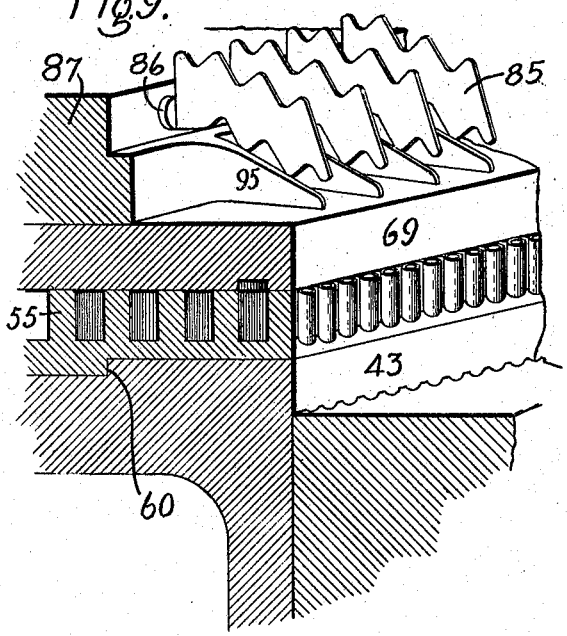
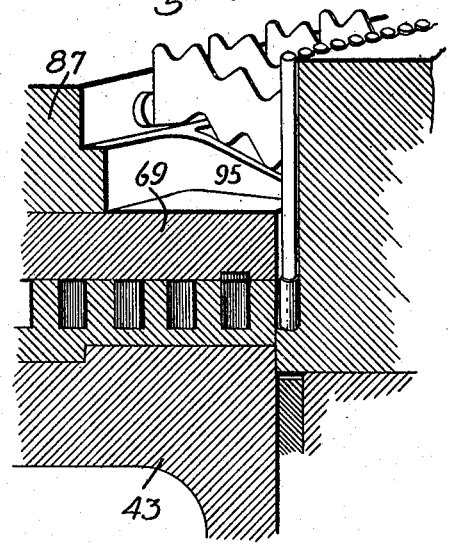
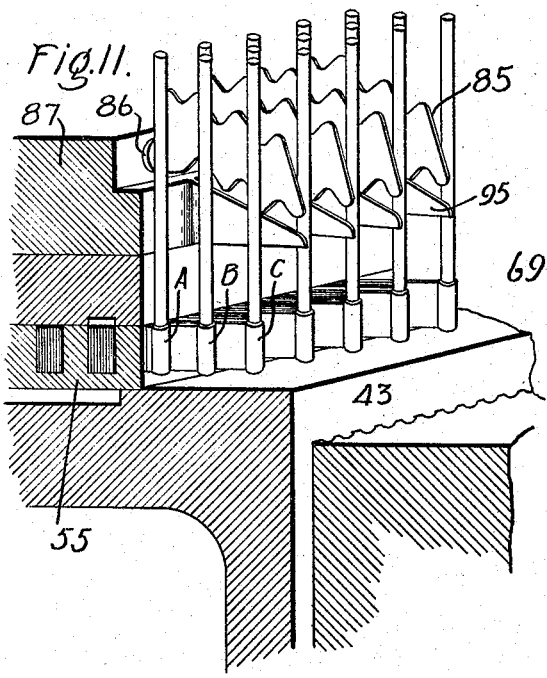
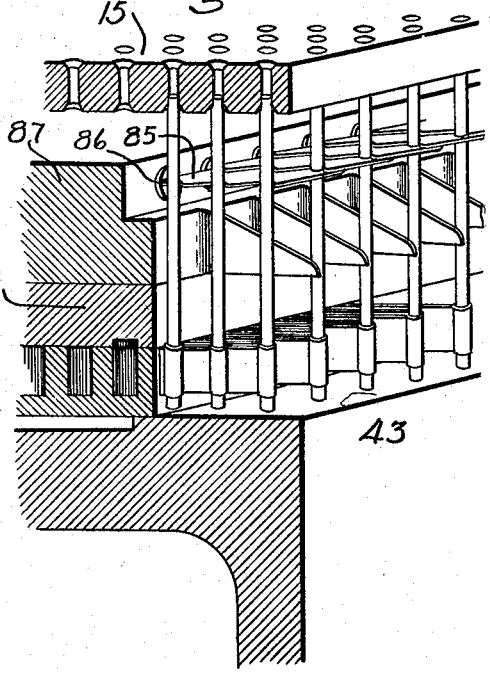

G. P. LOOMIS.
MATCH MAKING MACHINE.
APPLICATION FILED MAY 6, 1907.
900,029.
Patented Sept. 29, 1908.
9 SHEETS—SHEET 7.
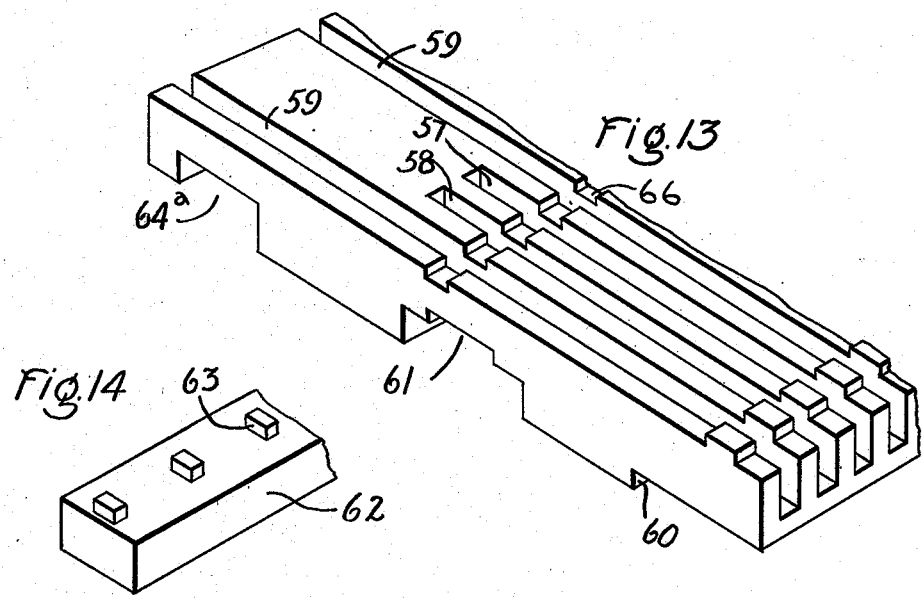
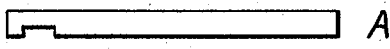
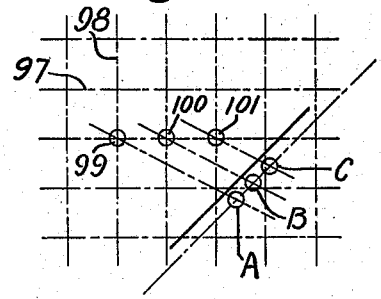
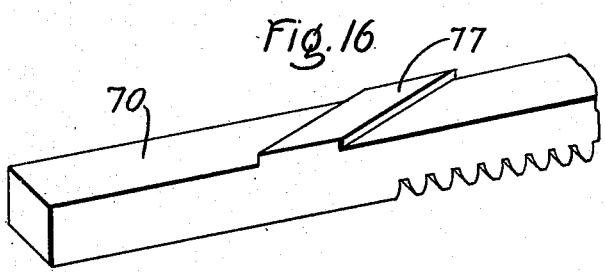
Witnesses:
Lloyd C. Bush
Genevieve Haynes
Inventor:
George P. Loomis,
By Alex. F. Macdonald.
Atty.

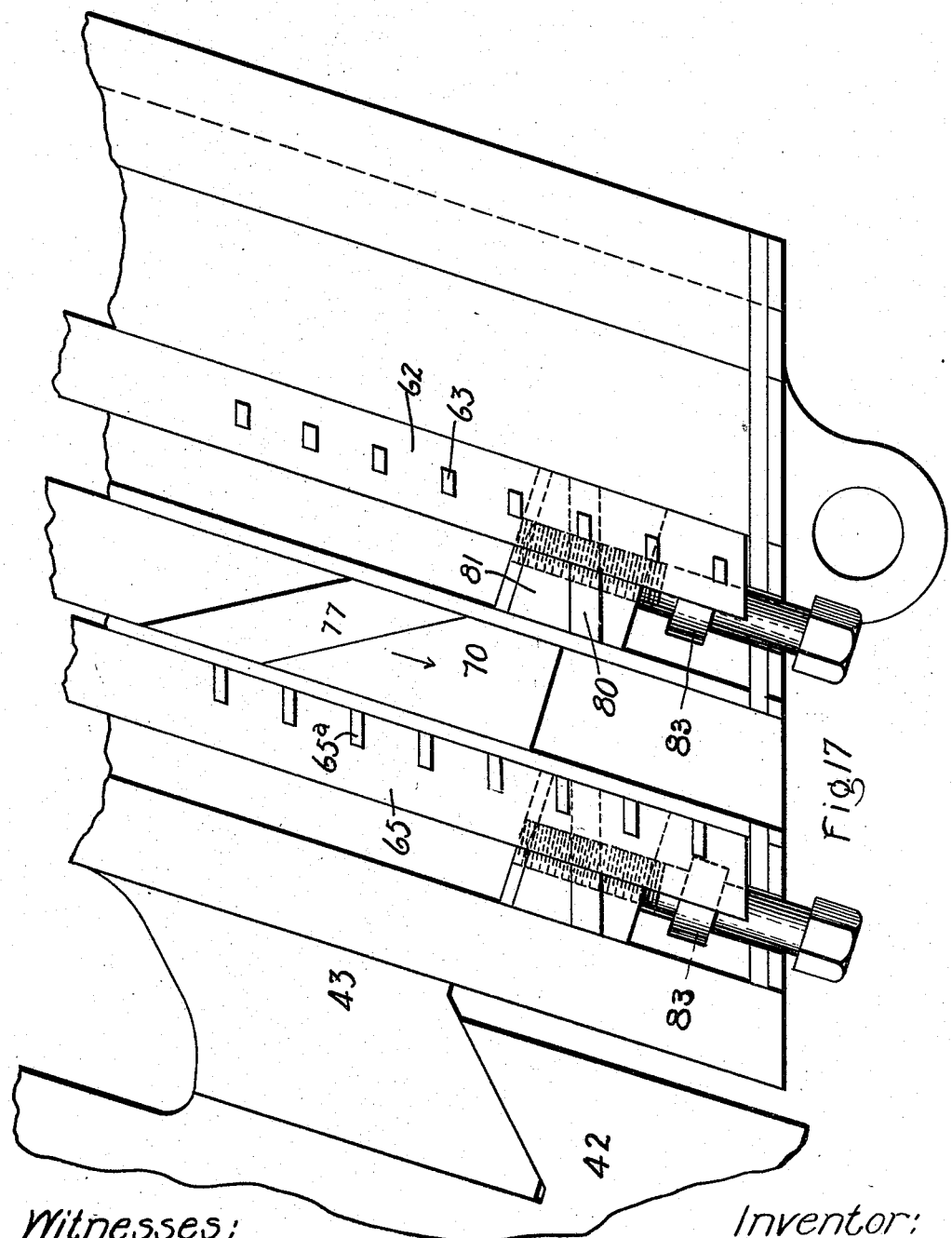

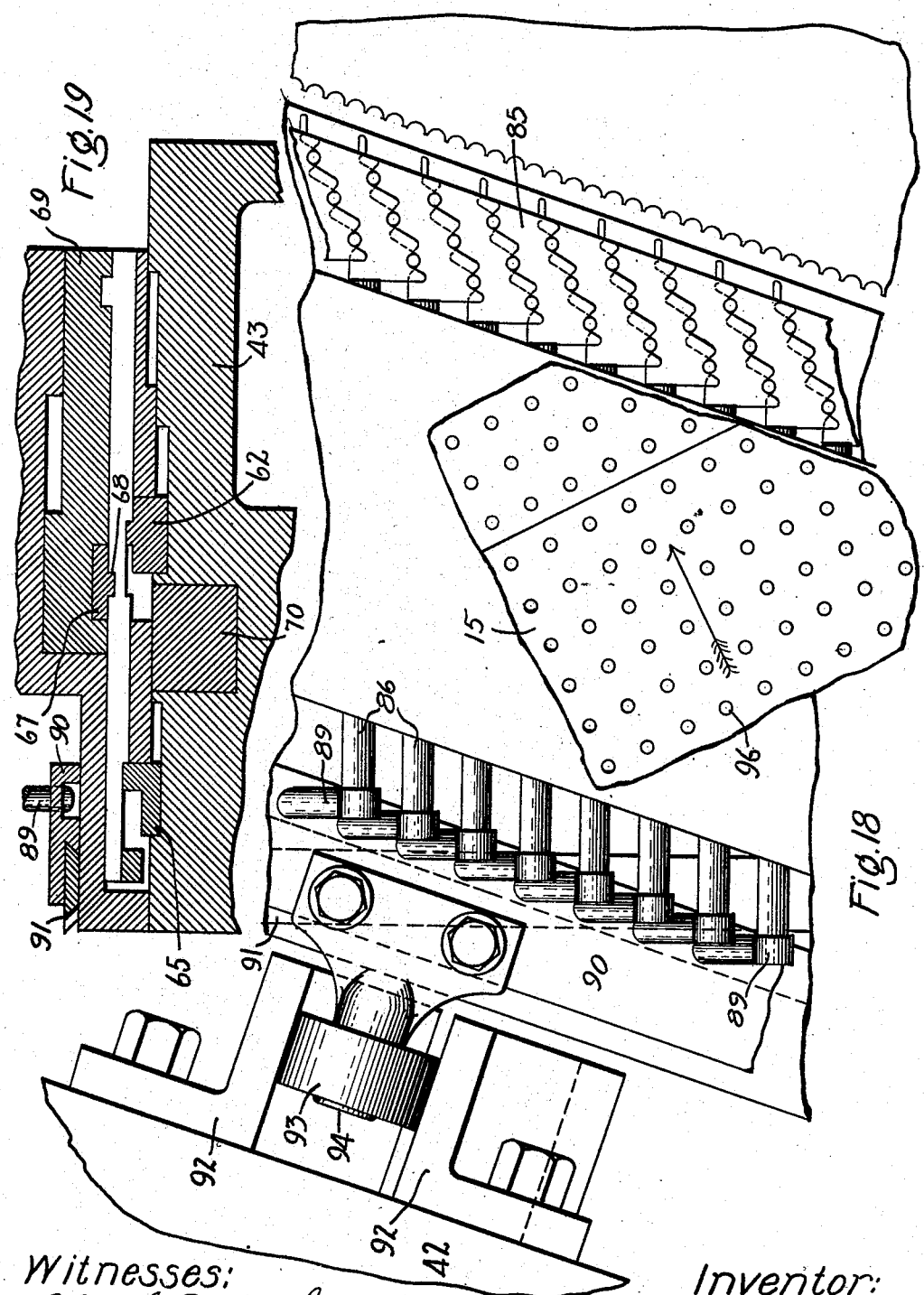

UNITED STATES PATENT OFFICE.

GEORGE P. LOOMIS, OF SCHENECTADY, NEW YORK.

MATCH-MAKING MACHINE.

No. 900,029.　　　　　Specification of Letters Patent.　　　Patented Sept. 29, 1908.

Application filed May 6, 1907. Serial No. 371,973.

*To all whom it may concern:*

Be it known that I, GEORGE P. LOOMIS, a citizen of the United States, residing at Schenectady, in the county of Schenectady, State of New York, have invented certain new and useful Improvements in Match-Making Machines, of which the following is a specification.

The present invention relates to machines for making matches, and has for its object to improve their construction whereby the output can be materially increased, without however increasing the size of the machine.

For a consideration of what I believe to be novel and my invention, attention is directed to the accompanying description and the claims appended thereto.

In the accompanying drawings, which illustrate one of the embodiments of my invention, Figure 1 is a partial side elevation of a match-making machine; Fig. 2 is a plan view thereof with certain of the parts broken away to expose the cutting head and the holders for the match splints; Fig. 3 is an end view of the machine with the upper portion broken away; Fig. 4 is a detail view showing the means for moving the knives and the knife case; Fig. 5 is an end view on a somewhat enlarged scale of the means for forcing the matches out of the holders and the hoppers which receive the finished matches and discharge them into the boxes; Fig. 6 is a detail sectional view of the same taken at right angles to that of Fig. 5; Fig. 7 is a detail view looking into certain of the compartments of the hopper; Fig. 8 is an enlarged sectional view through the head which carries the knives; Fig. 9 is a perspective view showing the knives advanced in the knife case ready to cut the wooden block from which the match splints are made; Fig. 10 is a perspective view showing the knives near the end of their cutting stroke; Fig. 11 is a perspective view showing the knives at the end of their cutting stroke, the said knives being drawn back into the knife-case; Fig. 12 is a perspective showing the match splints after they have been forced into one of the holders; Fig. 13 is a perspective view of one of the sections of the knife-case; Fig. 14 is a perspective view of one of the locking bars; Fig. 15 is a view showing the three kinds of knives employed; Fig. 16 is a perspective view of the main operating bar for moving the knife case; Fig. 17 is a plan view of the reciprocating head showing the location and arrangement of the main actuating bar and two of the knife-locking bars; Fig. 18 is a plan view of a portion of the head, with the fingers for centering and guiding the splints in their operative position; Fig. 19 is a sectional view of the knife-case and its co-operating parts; and Fig. 20 is a diagram showing the relation between the knives in their cutting positions and the holes in the holders to receive their splints.

The frame of the machine comprises side portions 1 which are connected by frame bars extending between and bolted thereto in the usual manner. The machine is driven by the main shaft 2 from a suitable source of power, such, for example, as an electric motor or counter-shaft. Mounted on the shaft is a pinion 3 meshing with a spur-gear 4 carried by a short shaft 5. On this shaft are eccentrics 6 and 7, the former actuating the splint or match holders step by step through the medium of the eccentric rod 8 and its strap. The free end of the rod is connected to a pivoted arm 9 that carries a spring-pressed pawl 10 on its upper end. The pawl acts on a ratchet wheel 11 mounted on the horizontal shaft 12. On opposite ends of this shaft are toothed wheels 13, Fig. 2, the teeth of which enter notches 14 in the ends of the perforated splint or match holders or carriers 15 and advance the same step by step. The holders are provided with rollers on the under side which travel in a suitable track.

Rising vertically at the left-hand end of the machine, Fig. 1, are frame bars 16 between which is supported the cross-head 17 for forcing the finished matches from the holders. This cross-head is provided with three rows of pins, Fig. 6, extending across the machine from side to side, whereby three rows of matches are simultaneously discharged into the hoppers. The cross-head is moved up and down by toggles comprising links 18 and 19, Fig. 1, the former being pivoted to the frame and the latter to the cross-head. Mounted in brackets 20 is a shaft 21 carrying arms 22, the latter being connected to the members of the toggles by the links 23. These links force the members of the toggle from the position shown into a straight-line position to drive out the matches.

On the end of the shaft 21 is an arm 24 connected by the rod 25 with the eccentric strap around the eccentric 7. Mounted on the shaft 21 is a second arm 30 having a slotted end. Adjustably attached to the arm is a rod 31, the lower end of which is attached to the pivoted arm 32. On the end of this arm is a spring-pressed pawl 33 for actuating the ratchet 34 carried by the shaft 35, the latter rotating the hoppers. On the shaft 35 is a disk 36 having notches 37, the said notches registering with the several positions of the hoppers. Mounted for engagement with the notches is a spring-pressed arm 38 that holds the hoppers in proper positions both for receiving and discharging matches.

On the right-hand end of the machine is a friction device for retarding the movements of the holders. It comprises a shaft 39 mounted in bearings on the frame and carrying wheels 40, Fig. 2, the teeth of which enter the notches 14 in the match-holders. On one end of the shaft is a wheel 41, Fig. 1, around which is a flexible band carrying a weight at its lower end. The friction between the strap and the wheel is sufficient to retard the rotation of the shaft 39 and hence the movement of the holders.

The construction and arrangement of the head which carries the knives will now be described: It is evident that the distance between the sides of a machine measured in a diagonal plane is greater than the distance measured in a plane perpendicular thereto. I make use of this fact and so dispose the head that the cutting edges of the knives occupy a diagonal plane and by reason of this fact I am able to increase the number of knives for a given width of machine and cut a greater number of match splints for a given stroke of the head than would be possible if the plane of the knives was perpendicular to the sides. This arrangement enables me to decrease the width of the machine to a minimum for a given output, or to increase the output for a given width. Decreasing the width of the machine means a shortening of the splint holders, a saving in floor space, a saving of stock used in constructing the machine, a decrease in the weight of the parts, especially of the match holders or carriers, and a decrease in the liability of the latter distorting or failing to move freely.

Extending diagonally across the machine is a frame bar 42 having a dovetail groove on the right-hand side, Fig. 2, to receive the vertically moving head 43. The left-hand side of the head is cut away adjacent the frame bar to receive the cams for reciprocating the knives and also the knife-case and for actuating the fingers which grip and at the same time direct the upper ends of the match splints, as will appear later.

Mounted below the head in suitable bearings, and extending parallel therewith, is a crank-shaft 44, Fig. 3, connected at the ends by two connecting-rods 45 and 46 with the head. In order to balance the weight of the head and its attached parts, wholly or largely, a counterweight 47, Figs. 2 and 8, is provided that moves up and down in a dovetail groove formed on the left-hand side of the diagonal frame bar 42. By using the same frame bar to guide the head and counterweight a saving in space and the number of parts is effected. The counterweight is connected to the head by a lever 48, Fig. 8, pivoted to the frame-bar 42 and vertical links 49 and 50.

Mounted on top of the head and movable therewith is a knife-case 55, Fig. 11, arranged to receive the knives for cutting the match splints. The knife-case is made in three sections, one for each section of the trough 56, Fig. 2, through which the match stock is fed. The knife case is made in sections so that it can be securely held in place on the head without springing, and also to facilitate manufacture. Each of said sections comprises a flat plate having rectangular grooves arranged in sets of three, 57, 58 and 59, Fig. 13. Each of these grooves is arranged to receive a knife A, B or C, Figs. 11 and 15, having a cylindrical cutting end and a shank of rectangular cross-section making a snug fit in the groove but free to slide therein under certain conditions. The grooves 57 and 58 in a given set are of the same length and extend only a portion of the way through the case while the groove 59 extends entirely therethrough. The front end of the case is cut away to form a shoulder 60 which, when the case is in its advanced position, engages a stop 60, Figs. 8 to 12, on the reciprocating head 43. The means for moving the knife-case bodily toward and away from the cutting position and in a plane perpendicular thereto will be described later. All of the cutters have to be moved longitudinally in order to move the match splints back to the desired positions for loading the holders 15. The knives are located as close together as possible in order to save splint stock and owing to this arrangement there is little space between them, whereas it is desirable to have considerable space between the splints when mounted in the holders. To this end the knives are moved after the splints are formed in a manner to open up the spaces between them. In the present embodiment of the invention every third knife has the same movement. The first knife has a relatively long movement, the second a shorter one, and the third knife of each set a still shorter one. These dissimilar movements of the knives plus the angular relation of the knives and holders result in widely separating the splints. I regard this feature as being of great importance. To provide for this movement in one instance the under side of the knife case is cut away at 61, Fig. 13, to receive the locking-bar 62, Figs. 8 and 14, extending lengthwise of the reciprocating head. The slot is considerably wider than the bar since it is necessary to have a certain amount of lost-motion to enable the knives of the set to be moved a predetermined amount while certain other knives, also arranged in sets, are being moved a greater amount. The locking-bar is provided with a series of short projections 63, so spaced apart as to engage every third knife. The locking-bar is also capable of sliding bodily in a sidewise manner on the reciprocating head 43 until it strikes a shoulder, the space providing for this lost-motion being shown at 64, Fig. 8.

The rear end of the knife-case is cut away on the under side at 64ª, Figs. 8 and 13, to receive the locking-bar 65, the said bar having projections thereon suitably spaced apart to engage the shank of every third knife and cause it to move a certain distance independent of the other sets of knives and the knife-case when the latter is moved bodily to or from the cutting position. The knife-case is also cut away on the top, as at 66, Fig. 13, to receive the locking-bar 67, Fig. 8. This bar is provided with projections 68 that enter corresponding notches in every third knife. The knives coöperating with this bar have the maximum movement in traveling from the cutting position to the holder-loading position and back again. The locking-bar 67 is seated in a plate 69, Figs. 8 to 12, that covers the top of the knife-case and moves therewith to and fro as occasion demands. Its movement is due to the fact that it is connected to the knife-case by the locking-bar 67. As each section of the knife-case is the same further description thereof is unnecessary. As to the locking-bars, it should be noted that they are common to the three sections of the knife-case and perform the same office with respect to each.

As before stated, it is necessary to move the knife-case bodily to the cutting position for loading the holders with the match splints. The mechanism for doing this will now be described.

Referring to Fig. 8, 70 indicates the actuator and comprises a horizontally extending bar located in a suitable slot formed longitudinally of the reciprocating head 43. The under side of this bar is provided with rack-teeth, Figs. 4 and 8, meshing with the teeth on a segmental gear 72, the said gear being mounted on a spindle 73 in the head 43. On the opposite end of the spindle is an arm 74 having a roller at its lower end which engages with and travels in the cam slot formed between the fixed bars 75 and 76, Figs. 4 and 8. It is evident that as the head moves up and down the roller on the end of the arm moving in the cam slot will swing the arm to and fro and in so doing move the actuator or operating bar 70 forward or backward. On the upper side of the said actuating bar are diagonally arranged splines or projections 77, Figs. 4 and 16, two for each section of the knife-case, which enter diagonal slots in the under side of said knife-case. From this it follows that as the reciprocating head 43 carrying the knife-case moves up or down by an amount sufficient to cause the roller on the arm 74 in the cam slot to swing the same, it will move the knife-case sections bodily and as a unit toward or away from the cutting position. The angle of inclination of the splines and their length is sufficient to move the parts to the different positions shown in Figs. 9 to 12. As before pointed out, the locking-bars 62, 65 and 67 when moved by the knife-case move the knives by an amount depending upon the total bodily movement of the knife-case and upon the lost-motion between said bars and the shoulders or stops on the head 43.

In Fig. 17 is shown a partial plan view of the reciprocating head 43 with the knife-case removed. 42 indicates the diagonal frame bar of the machine having a dovetail slot to receive the dovetail projection on the head. Extending across the head are the locking-bars 62 and 65, shown in section, Fig. 8, which lock the knives B and C, Figs. 11 and 15, of each set in the knife-case. The movements of these bars are confined to the spaces between the opposed shoulders on the head. As shown the bars are both at their extreme right-hand positions. On the bar 62 are shown the projections 63 which enter the slots 63ª in the under side of the knives B of each group, and on bar 65 are shown the projections 65ª which enter slots 65ᵇ in the under side of knives C of each group, and cause the same to move a certain distance each time the knife-case is moved. The bars are guided in their movements by guides 80 formed on adjustable blocks 81 extending parallel with the sides of the head. The blocks are let into recesses in the head and are capable of a small amount of adjustment. Each block is provided with an adjusting-screw 82 having a collar 83 thereon which is let into a recess in the head 43. This collar permits the screw to be turned to adjust the block while confining it against longitudinal movement. When it is desired to remove one or more of the knives, this screw is turned to move the projections 63 on the locking-bar 62 out of the notches 63ª in the knives, after which the knives can be pulled out of their grooves or sockets in the knife-case. The reverse operation takes place in securing the knives. The same construction is utilized in connection with the other locking-bars for adjusting them and permitting insertion and removal of the knives. In Fig. 17 is also clearly shown in plan the main operating bar or actuator 70 for moving the knife-case toward and away from the cutting position. The bar is let into a groove formed in the head and in its movements is guided by the walls thereof. On the top of the bar is shown one of the six splines 77 used to impart movement to the knife-case. When the bar is moved in the direction of the arrow it moves the knife-case backward from the cutting position and also the individual knives with respect to the case.

In order to guide the upper ends of the match splints into the holes in the holders, special means are provided comprising a plurality of fingers which come into service on the upward stroke of the head 43 and after the actuating bar 70 has moved the knife-case and the knives back to their respective positions. The fingers 85 are composed of thin flat pieces of steel having three corrugations in each of their edges, Figs. 9 to 12 and 18, so that when turned from the vertical to the horizontal position, the opposing surfaces of each pair will form three openings for the match splints held by the sets of knives A, B and C. These openings register with those in the holders, each splint going into a separate row. Thus it will be seen that although the splints are cut by knives very closely associated to avoid waste of match stock, the splints are quite widely separated in the holders so as to avoid all danger of the ignition paste bridging adjacent splints. The surfaces of the fingers forming the openings for the splints are inclined so as to guide, and move if necessary, the splints to their proper positions. The fingers stand vertically when inactive and are turned to the horizontal for service. Each finger is attached to a spindle 86, Fig. 18, mounted in the plate 87 and extending parallel with the shanks of the knives. The plate 87 is firmly attached to the top of the reciprocating head 43 by bolts 88, Fig. 2, of which there are four, two at the ends and two between the sections of the knife-case. This arrangement prevents the knife-case sections from yielding on the cutting stroke. The left-hand end of each spindle is provided with a crank 89, Fig. 18, for giving it a quarter turn in one direction to cause the fingers to grasp the match splints, and a quarter turn back to release them. In order to move the fingers simultaneously the end of each crank enters a hole in a sliding-bar 90. The holes are so made that the necessary freedom is permitted each crank to enable it to turn, it being noted that the planes of the cranks and the actuating-bar are not parallel. The bar 90 is provided with a dovetail slot through which extends the dovetail key 91. The key, being disposed at an angle to the rear surface of the head, will when the sliding bar is moved longitudinally impart thereto a sidewise movement. The key, it will thus be seen, not only secures the bar in its proper position with respect to the head, due to its formation, but assists in its longitudinal movements. The angle of inclination of the key is the same as that of the splines 77 because the parts actuated by both have the same movements.

In order to reciprocate the sliding bar 90 a cam is provided composed of two parallel L-shaped pieces 92 attached to the diagonal frame-bar 42 of the machine, Figs. 2 and 18. Located between the L-shaped pieces is a roller 93 carried on a spindle 94 which is bolted to the top of the sliding bar 90. The cam has a shape similar to the one shown in Fig. 4 for moving the knife-case. As the bar 90 moves longitudinally it also moves sidewise and the opposed walls of the cam are made parallel to permit the roller 93 to move toward and away from the diagonal frame-bar 42 as required. The relation of the cam and the sliding bar 90 is such that the latter turns the fingers into the horizontal plane after the knives begin to move the splints upward and the knife-case is drawn back and before the knives force the splints into the openings in the holders. The fingers are opened sufficiently to release the splints when the head 43 starts downward, and are fully opened before the knife-case is advanced and the cutting stroke commences. Formed on the forward end of the plate 87 are projections 95 which extend over the knife-case when the knives are in the cutting position, as in Fig. 9, and project between the splints, as in Fig. 11, when the knife-case is retracted. These projections serve to reinforce the plate 69 upon which there is considerable thrust during the cutting operation.

In Fig. 18 is clearly shown the relation that the holders 15 occupy with respect to match splints. From this figure it will be clearly seen that the holes 96 to receive the splints are laid out in parallel rows, and so spaced apart that there is no chance whatever for the ignition paste to bridge from one to the other, even though the matches should get out of alinement. It is evident that the plane of division between plates must be located half way between the holes, and also that more than a single holder will be receiving splints at the same time.

In order that certain of the advantages of my improved construction may readily be seen, the diagram, Fig. 20, has been prepared. The lines 97 and 98 have been laid off to form squares, and at the points of intersection the holes 96 in the holders, plates or carriers 15 are located. A, B and C indicate the knives and their relative positions with respect to the holes in the holders as shown. The knife A has the greatest distance to travel since its splint has to be moved back to register with the hole 99 in the holder; the knife B has the next longest distance to travel to bring its splint under hole 100 in the holder, and the knife C has the shortest distance to travel to bring its splint under the hole 101 in the holder. From this it will be apparent that while the splints are cut from the stock very close to each other, when they are inserted in the holders they are quite widely separated.

After the splints are formed and inserted in the holders the latter are moved by suitable mechanism, such for example as that shown in my Patent No. 808,767, dated Jan. 2, 1906, in a manner to dip the splints in paraffin, after which they are coated with ignition paste and subsequently dried by passing them back and forth over the machine on suitable tracks.

After the matches are completed, the next step is to force them out of the holders and load the boxes. This is accomplished by the following means, Figs. 5 to 7. The movements of the holders are so timed with respect to the cross-head 17 that each time the latter descends three rows of completed matches are forced out of the holders and permitted to drop through the chutes 102, into the hoppers 103, of which four sets are provided. These hoppers are mounted on the spindle 35 which is so timed that it advances a quarter turn for every down stroke of the cross-head. Each hopper has a number of compartments each provided with a neck 104 which registers with the chute 102 and a receptacle 105. In the wall of each neck is formed a door 106 which is open when the hopper is under the chute and is closed when the same is moved, by means of a crank 107, the free end of which has a roller traveling in the slot in cam 108. These doors are closed in all of the compartments of the hoppers except the one directly under the chute. The compartments of the hopper are also each provided with a door 109 set at an incline, Fig. 7, so that the matches will collect on one side and arrange themselves in parallel relation. Further, the inclined arrangement of the doors is such that the matches will be discharged by a minimum opening, and this very quickly. These doors are provided with cranks 110 that enter holes in a rod 111, the latter being provided with a roller at one end for engagement with the fixed cam 112 and an extension spring 113 at the other. As the hoppers rotate the doors will open, discharge the matches, and close once for each revolution of the shaft 35. Situated beneath the hopper is a discharge chute 114 having directing plates 115 for directing the matches into the boxes situated below and carried on a belt 117, the latter being driven by the pulley 118, Fig. 1.

The operation of the machine is as follows: Assuming that the match stock is in the troughs, the downward stroke of the head 43 from the position shown in Fig. 8 will form the splints, after which the cranks pass the lower dead center and start the head upward. After moving a certain distance in the upward direction the arm 74 and its attached roller move the segmental gear 72 and the operating bar 70 from right to left, Fig. 4, or from the upper to the lower side of Fig. 2. This action causes the knife-case to move backward away from the cutting position, and in so doing to move the locking-bars 62, 65 and 67; bar 65 and its attached knives—every third one in the knife case—moving the greatest distance, bar 62 and its knives next and finally the bar 68. This leaves the parts in the position shown in Fig. 11. At or about this portion of the cycle the cam 92, Figs. 2 and 18, comes into service and moves the sliding-bar 90 and the cranks 89 attached to the fingers 85, causing the latter to turn through 90° and in so doing center the match splints. Further movement of the head 43 on its upward stroke forces the splints into the holders or carriers 15, Fig. 12, the upper surface of the head acting as a butting-block to force the splints into the holders. After the cranks pass the upper dead center, the head 43 begins to move downward and with it the sets of knives A, B and C. At or about the time the knives leave the splints the fingers are returned to their normal position by reason of the sliding-bar 90 returning to its normal position. Shortly after the cranks pass the upper dead center, the operating bar 70 with its splines 77 force the knife-case forward to the position shown in Figs. 8 and 9, when the machine is ready for the next stroke. After the splints cut on one stroke have been forced into the holders 15, the eccentric 6, Fig. 1, and its attached parts advance the holders preparatory to receiving new splints. Simultaneously with the loading of the holders the cross-head 17 is discharging finished matches into boxes. The machine illustrated will cut 150 splints per stroke and is intended to make 125 strokes per minute but it is to be understood that these figures are merely illustrative, and are not intended as limitations, since the number of splints cut per stroke and the number of strokes per unit of time can be varied.

By arranging the cutting edges of the knives in a diagonal plane with respect to the sides of the machine I am able to use a greater number of knives and cut a greater number of splints for a given stroke than would be the case if the plane of the knives was perpendicular to the sides. This is made evident by the fact that a diagonal line connecting two parallel lines is longer than one perpendicular thereto. Owing to the diagonal arrangement of the cutting edges of the knives shorter splint holders or carriers can be employed which means a material reduction in cost and weight and improvement in operation due largely to the avoidance of any tendency of the parts to spring. The feature of moving the knives independently in the knife case to increase the spacing of the match splints preparatory to inserting them in the holders or carriers is also of marked advantage because it enables me to cut the splint stock with minimum waste (the knives being very close together) yet when the splints are inserted in the holders or carriers they are sufficiently far apart to prevent the ignition paste from forming bridges between adjacent matches.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is,

1. In a machine of the character described, the combination of a frame having parallel sides and means for uniting them, a cutting head which extends diagonally between the sides of the frame, knives mounted on the head, a work-holder also arranged diagonally of the frame, a means causing the knives to cut the stock into splints, and holders which receive and convey the splints from the knives and move on the side portions of the frame and extend perpendicularly between them.

2. In a machine of the character described, the combination of a frame having parallel sides and means for uniting them, a cutting head which extends diagonally between the sides of the frame, knives on the head arranged diagonally with respect to said sides, a means for reciprocating the head and the knives, a work-holder also arranged diagonally of the frame, and holders that receive and convey the splints from the knives and which extend perpendicular to the sides of the frame.

3. In a machine of the character described, the combination of a frame having parallel sides and means for uniting them, a reciprocating head mounted on the frame and extending diagonally between the sides, guides directing the movements of the head, a crank for reciprocating the head, knives mounted on the head, the cutting surfaces of which occupy a plane diagonal to that of the sides of the frame, a work-holder also arranged diagonally of the sides of the frame, and holders which receive and convey the splints from the knives, the said holders extending perpendicularly to the sides of the frame.

4. In a machine of the character described, the combination of a frame having parallel sides and means for uniting them, a reciprocating head mounted on the frame and arranged diagonally with respect to the sides, knives carried by the head, the plane of the cutting surfaces being diagonal with respect to the sides, means for retracting and advancing the knives on the head with respect to their cutting positions, a work-holder also arranged diagonally with respect to the sides of the frame, and holders extending perpendicularly to the sides of the frame that receive and convey the splints from the knives after the said means has retracted them.

5. In a machine of the character described, the combination of a frame having parallel sides and means for uniting the sides, a reciprocating head mounted on the frame and extending diagonally across it with respect to the sides, knives carried by the head, and arranged in sets, a means for simultaneously retracting and advancing the corresponding knives of each set, the knives of one set having a greater travel than those of other sets, a work-holder, and holders which receive and convey the splints from the sets of knives after they have been retracted.

6. In a machine of the character described, the combination of a frame, a reciprocating head mounted thereon, individual knives mounted on the head and arranged in sets, means for retracting the knives of the sets by different amounts from their cutting positions together with the splints which have been formed and are held thereby for increasing the spaces between the splints, a work-holder, holders which receive the splints from the knives after they have been retracted, and means for advancing the last-mentioned holders between cutting strokes of the knives.

7. In a machine of the character described, the combination of a frame, a reciprocating head mounted thereon, a knife-case mounted thereon, knives in the case, a means for retracting and advancing the knife-case with respect to the cutting position, devices actuated by the means for retracting and advancing some of the knives by a greater amount than the others, a work-holder, holders to receive the finished splints, and a means for advancing the last-mentioned holders between cutting strokes of the knives.

8. In a machine of the character described, the combination of a frame, a head mounted thereon, a knife-case mounted on the head, knives in the case arranged in sets, a means for retracting and advancing the knife-case in a plane perpendicular to that of the cutting stroke, devices actuated by said means which move the sets of knives by different amounts to increase the spacing of the splints, holders to receive the finished splints from the sets of knives, and means for advancing the splint holders between cutting strokes of the knives.

9. In a machine of the character described, the combination of a frame, a reciprocating head mounted thereon, a slotted knife-case mounted thereon, knives located in the slots in the case, a device to move the knives longitudinally in said slots and certain of them by a greater amount than the others to increase the spacing between splints carried thereby preparatory to inserting the latter in the holders, a means actuated by the head as it reciprocates for retracting and advancing the knife-case between cutting strokes, a crank for reciprocating the head, holders for receiving the finished splints from the knives, and a driving means common to the crank and the splint holders.

10. In a machine of the character described, the combination of a frame, a head mounted diagonally thereon, a knife-case, knives mounted therein and arranged in sets, locking-bars common to the knives of the different sets, lost-motion connections between the bars and the knife-case, a means actuated by the up-and-down movement of the head for moving the knife-case and through it the bars, holders for the finished splints, and driving means for moving the head and the splint holders.

11. In a machine of the character described, the combination of a frame, a head mounted thereon, a knife-case carried by the head, knives mounted on the knife-case, and arranged in sets of three, locking-bars which are common to the corresponding knives of each set, lost-motion connections between certain of the bars and the knife-case for moving the knives by different amounts to increase the spacing of the splints, a means for moving the knife-case bodily in a plane perpendicular to that of the cutting plane of the knives and through it the locking-bars, holders which receive the splints after the knives have been retracted from their cutting positions, and a driving means common to the head and the splint holders.

12. In a machine of the character described, the combination of a frame, a reciprocating head mounted thereon, a knife-case carried by the head, means for retracting and advancing the knife-case and the knives with respect to the cutting position, individual fingers which are turned on their axes to grasp and guide the splints as the knives are retracted, means for turning the fingers on their axes, perforated holders to receive the splints, and driving means for the head and holders.

13. In a machine of the character described, the combination of a frame, a reciprocating head mounted thereon, a knife-case carried by the head, a cam for retracting and advancing the knife-case and the knives with respect to the cutting position, individual fingers which are turned on their axes to grasp and guide the splints after the retracting movement of the knives commences, a cam which is common to the fingers for turning them on their axes, holders for receiving the splints after the knives are retracted, and a driving means for reciprocating the head and advancing the holders step by step between cutting operations.

14. In a machine of the character described, the combination of a frame, a reciprocating head mounted thereon, a knife-case carried by the head, means for retracting and advancing the knife-case and the knives with respect to the cutting position, fingers for grasping the splints which have corrugated sides and occupy vertical positions when idle, a means for turning the fingers on their axes to cause the edges thereof to engage and direct the splints, holders which receive the splints, and a driving means.

15. In a machine of the character described, the combination of a frame, a head mounted thereon, knives mounted on the head and individually movable thereon, a means for retracting and advancing the knives individually on the head with respect to the cutting position, comprising a bar, certain of the knives having a greater movement than the others, a spline on the bar, a member coöperating therewith, a cam and lever moving with the head for moving the bar longitudinally, holders to receive the splints from the knives, and a driving means for the head and splint holders.

16. In a machine of the character described, the combination of a frame, a head mounted thereon, a counterbalance for the head, a knife-case carried by the head, knives in the case, a means for moving the case comprising a reciprocating bar, gearing and a cam, locking-bars which communicate the motion of the knife-case to the knives for moving them different distances to increase the spacing of the finished splints preparatory to inserting them in the holders, splint holders, and means for actuating said holders and the head.

17. In a machine of the character described, the combination of a frame, a head mounted thereon, a grooved knife-case carried by the head, notched knives in the grooves, locking-bars which enter the notches in the knives, a plate which rests on top of the knife-case, and contains one of the locking-bars, lost-motion connections between the other bars and the knife-case, an operating bar, a spline thereon which engages the knife case for moving it, a gear which operates the bar, and a cam for moving the gear.

18. In a machine of the character described, the combination of a frame, a reciprocating head mounted thereon, a knife-case carried by the head, knives therein, a plate that forms the top of the knife-case and receives the thrust of the knives, a second plate on top of the first which is fixed with respect to the head, fingers for guiding the splints mounted in the second plate, a means for actuating the fingers, and a means for retracting and advancing the knife-case and knives with respect to the cutting position.

19. In a machine of the character described, the combination of a head, a grooved knife-case carried thereby, notched knives mounted in the grooves and arranged in sets, locking-bars for the knives, each bar having projections which enter the notches in corresponding knives of each set, means for moving the bars by different amounts in planes perpendicular to the path of movement of the head for increasing the spaces between the finished splints, and holders which are provided with rows of perforations to receive the splints, the plane of a given row of perforations being at an angle to the plane of movement of the head.

20. In a machine of the character described, the combination of a frame, a head mounted thereon, knives carried by the head, a work-holder, holders which move along the frame and receive the finished splints from the knives, and means for causing relative movements of the knives and holders whereby a plurality of rows of splints can be simultaneously inserted in the holders, certain of the knives being moved by a greater amount than the others to increase the spacing of the splints, and a driving means for actuating the head and advancing the holders.

21. In a machine of the character described, the combination of a frame, a head mounted diagonally thereon, a work-holder, holders which occupy planes perpendicular to the sides of the frame and have rows of splint-receiving openings similarly arranged, knives mounted on the head, a driving means for reciprocating the head and moving the holders step by step, and a means which moves the knives by different amounts to increase the spacing of the splints preparatory to their entrance into the openings in the holders.

22. In a machine of the character described, the combination of a frame, a head mounted diagonally thereon, a work-holder, holders which occupy planes perpendicular to the sides of the frame and have rows of splint-receiving openings similarly arranged, knives mounted on the head and arranged in sets, a driving means for reciprocating the head and moving the holders step by step, independent means for moving the knives perpendicular to the path of movement of the head, the said means moving the sets of knives by different amounts to increase the spacing of the splints preparatory to their entrance into the openings in the splint holders, and mechanism for actuating the said means.

23. In a machine of the character described, the combination of a frame, a head mounted diagonally thereon, a work-holder, splint holders, a driving means for the holders, the latter moving along the frame with their sides perpendicular thereto, knives carried by the head, a crank for moving the head downward to cause the knives to cut the splints and to force them into the holders on the upward stroke, means for retracting the knives on said upward stroke by different amounts and to advance them on the downward stroke, fingers for centering and guiding the splints, and means for actuating the fingers in a manner to grasp the splints on the upward stroke of the crank and to release them on the downward stroke.

24. In a match-making machine, the combination of a frame, a head diagonally mounted thereon, a knife-case carried by the head, knives in the case, locking-bars for the knives which extend parallel to the front of the head and act through lost motion to move some of the knives more than others to increase the spacing of the splints, an actuating-bar for the knife-case and the locking-bars, which is also parallel to the front of the head, a cam carried by the frame, a means coöperating with the cam and said bar for actuating it, holders for the splints which extend perpendicular to the sides of the frame, and a means for moving the head and the holders.

25. In a machine of the character described, the combination of a frame, a head movable thereon, individual knives carried by the head and moving with it, means for retracting some of the knives from the cutting position and independently of the head by a greater amount than the others to increase the spacing of the splints preparatory to loading the holders, holders mounted on the frame and movable over the knives to receive the splints, and a work-holder for feeding stock to the knives.

In witness whereof I have hereunto set my hand this 3rd day of May, 1907.

GEORGE P. LOOMIS.

Witnesses:
EDWARD WILLIAMS, Jr.,
BENJAMIN B. HULL.